United States Patent [19]

Trick

[11] Patent Number: 5,507,195
[45] Date of Patent: Apr. 16, 1996

[54] CHANGE-SPEED LAYSHAFT GEARBOX CONFIGURABLE AS A SINGLE RANGE OR A MULTIPLE RANGE TRANSMISSION

[75] Inventor: Wolfgang Trick, Hochdorf, Germany

[73] Assignee: Mercedes-Benz AG, Stuttgart, Germany

[21] Appl. No.: 242,633

[22] Filed: May 13, 1994

[30] Foreign Application Priority Data

May 14, 1993 [DE] Germany .......................... 43 16 153.7

[51] Int. Cl.⁶ .............................. F16H 3/02; B60K 17/08
[52] U.S. Cl. ................................................ 74/325; 74/333
[58] Field of Search ............................. 74/325, 333, 356, 74/357, 362, 363, 745

[56] References Cited

U.S. PATENT DOCUMENTS 2,886,982  5/1959  Thomas ..................................... 74/745

FOREIGN PATENT DOCUMENTS

| | | |
|---|---|---|
| 0448457 | 9/1991 | European Pat. Off. . |
| 2386741 | 4/1978 | France . |
| 2344797 | 3/1974 | Germany .................. 74/325 |
| 2916738 | 1/1980 | Germany . |
| 4129290 | 2/1993 | Germany . |
| 4128832 | 3/1993 | Germany .................. 74/325 |
| 4226575 | 9/1993 | Germany . |
| 1500518 | 8/1989 | U.S.S.R. ................................. 74/333 |
| 1717419 | 3/1992 | U.S.S.R. ................................. 74/333 |
| 2028935 | 3/1980 | United Kingdom . |

OTHER PUBLICATIONS

Zahnradfabrik Friedrichshafen AG, "Six Speed Single-Range Gearbox S6–66", Publication F 43 542/RT 3427–789, pp. 1–8 no date given.

Primary Examiner—Khoi Q. Ta
Attorney, Agent, or Firm—Evenson, McKeown, Edwards & Lenahan

[57] ABSTRACT

A change-speed gearbox with a constant mesh gear and a plurality of gear stages non-geometrically graduated gear ratios is a single-range gearbox which forms a member of a gearbox series to which there belongs a multi-speed gearbox formed by expanding the single-range gearbox a splitter group using identical gear stages as drive connections between the layshaft and the output shaft.

1 Claim, 3 Drawing Sheets

| GEARBOX | 18 in Fig. 1 | 19 in Fig. 4 |
|---|---|---|
| SPREAD | 9.2 | 12.1 |
| $i_{20}/i_{12}$ $i_{11}/i_{12}$ | -- 2.21 | 1.96 2.39 |
| GEAR | | |
| 1 L | 9.20 | 9.96  1.22 |
| 1 S | -- 1.76 | 8.17  1.44 |
| 2 L | 5.23 | 5.66  1.22  1.76 |
| 2 S | -- 1.66 | 4.65  1.36 |
| 3 L | 3.15 | 3.41  1.22  1.66 |
| 3 S | -- 1.55 | 2.79  1.27 |
| 4 L | 2.03 | 2.20  1.22  1.55 |
| 4 S | -- 1.48 | 1.81  1.21 |
| 5 L | 1.37 | 1.49  1.22  1.48 |
| 5 S | -- 1.37 | 1.22  1.22 |
| 6 L | 1.00 | 1.00  1.22  1.49 |
| 6 S | | 0.82 |
| COLUMN | 1 | 2 |

FIG. 7

CHANGE-SPEED LAYSHAFT GEARBOX CONFIGURABLE AS A SINGLE RANGE OR A MULTIPLE RANGE TRANSMISSION

BACKGROUND AND SUMMARY OF THE INVENTION

The present invention relates to a change-speed gearbox comprising an input shaft and an output shaft arranged coaxially, a layshaft parallel to the input shaft and the output shaft, a constant mesh gear formed by a gear stage and forming a drive connection between the input shaft and the layshaft, and a plurality of gear stages which form drive connections between the layshaft and the output shaft, the plurality of gear stages being optionally selectable and in conjunction with the constant mesh gear form non-geometrically graduated gear ratios.

A gearbox series including a change-speed gearbox of the general type described above designed as a six speed single-range gearbox S6-66 is shown in Publication F 43 542/RT 3427-789 from Zahnradfabrik Friedrichshafen AG, which can be expanded to a twelve-speed multi-speed gearbox S6-66+GV 66 by a splitter group GV 66 to form a gearbox series.

In gearbox series of this kind there is the problem that, for reasons of driving power, the single range gearbox is as a rule graduated progressively to give a favorable ratio jump between the two highest gears, i.e. in the known single-range gearbox between the gear ratios of the fifth gear and of the sixth gear. The result is that "splitting" of the main driving gears IV, V and VI gives rise to different split jumps. In order to avoid this disadvantage, the ratios of those gear stages in the known twelve-speed multi-speed gearbox S6-66+GV 66 which correspond to the gear stages for the formation of gears IV and V in the six-speed single-range gearbox S6-66 are modified relative to the relevant gear stages of the single-range gearbox S6-66. This makes it impossible, in the case of the known gearbox series, to use the same basic gearbox for both the single-range gearbox and the multi-speed gearbox elements.

German Patent Document DE 41 29 290 CI discloses a change-speed gearbox for motor vehicles in which an input shaft and an output shaft are arranged parallel to a layshaft and a respective drive connection can be established between the input shaft and the layshaft via two alternately selectable gear stages and a drive connection between the layshaft and the output shaft can be established via a further gear stage, and in which the layshaft gearwheel of one of the gear stages has the smaller number of teeth relative to the main shaft gearwheel meshing with it, and only two of the three gear stages have the same total number of teeth. In order to create a gearbox series which comprises a number of different types of gearbox for different permissible input torques while taking account of the requirement for the reduction of the number of different components to a minimum, this known change-speed gearbox is designed in such a way that a second layshaft gearwheel, which belongs to one of the two gear stages having the same total number of teeth, has the smaller number of teeth.

An object of the present invention is to provide a gearbox series in which it is possible to use an essentially unmodified basic gearbox for the single-range gearbox and the multi-speed gearbox.

This and other objects are achieved by the present invention which provides a change-speed gearbox comprising an input shaft and an output shaft arranged coaxially, a layshaft parallel to the input shaft and the output shaft, a constant mesh gear formed by a gear stage and forming a drive connection between the input shaft and the layshaft, and a plurality of gear stages which form drive connections between the layshaft and the output shaft, the plurality of gear stages being optionally selectable and in conjunction with the constant mesh gear form non-geometrically graduated gear ratios. The change-speed gearbox is configurable as a single-range gearbox and as a multi-speed gearbox, with identical gear stages used as drive connections between the layshaft and the output shaft for both the single-range gearbox and for the multi-speed gearbox configurations. The constant mesh gear of the single-range gearbox configuration has a smaller ratio than the constant mesh gear of the multi-speed gearbox configuration, the multi-speed gearbox configuration including a splitter group formed by a gear stage which can be selected alternatively with the constant mesh gear of the multi-speed gearbox to serve as the drive connection between the input shaft and the layshaft. In the multi-speed gearbox configuration, the quotient of the transmission ratio of the constant mesh gear and the transmission ratio of the splitter group is at least approximately equal to the square root of a ratio jump between the two highest gears without the splitter group.

When the change-speed gearbox according to the invention is used as a multi-speed gearbox, close, uniform gradation of the upper six driving gears is achieved and, despite this, only the constant mesh gear is modified as compared with the embodiment as a single range gearbox, reducing the number of different components required for the gearbox series to a minimum.

While, in the known twelve-speed multi-speed gearbox, the spread is greater only by the split jump than in the corresponding six-speed single-range gearbox, the spread in the twelve-speed multi-speed gearbox according to the invention is additionally increased, relative to the spread of the associated single-range gearbox, by the larger ratio of the constant mesh gear. This greater spread is particularly advantageous in multi-speed gearboxes because they are intended for heavier-duty applications than single-range gearboxes.

Other objects, advantages and novel features of the present invention will become apparent from the following detailed description of the invention when considered in conjunction with the accompanying drawings.

BRIEF DESCRIPTION OF THE DRAWINGS

FIG. 7 shows a table for comparison of transmission data of the two change-speed gearboxes of FIG. 1 and FIG. 4.

DETAILED DESCRIPTION OF THE DRAWINGS

Figure 1:
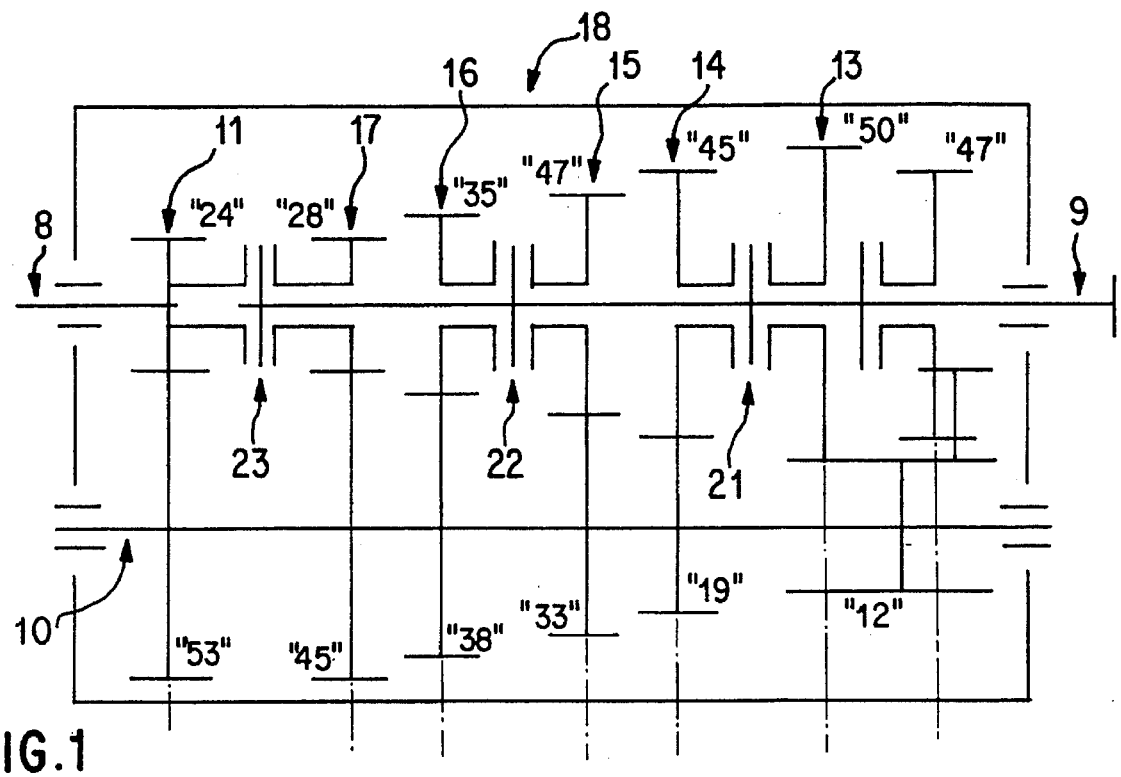
FIG. 1 shows the gearbox diagram of a change-speed gearbox which is a single-range gearbox according to an embodiment of the invention.
Figure 3:
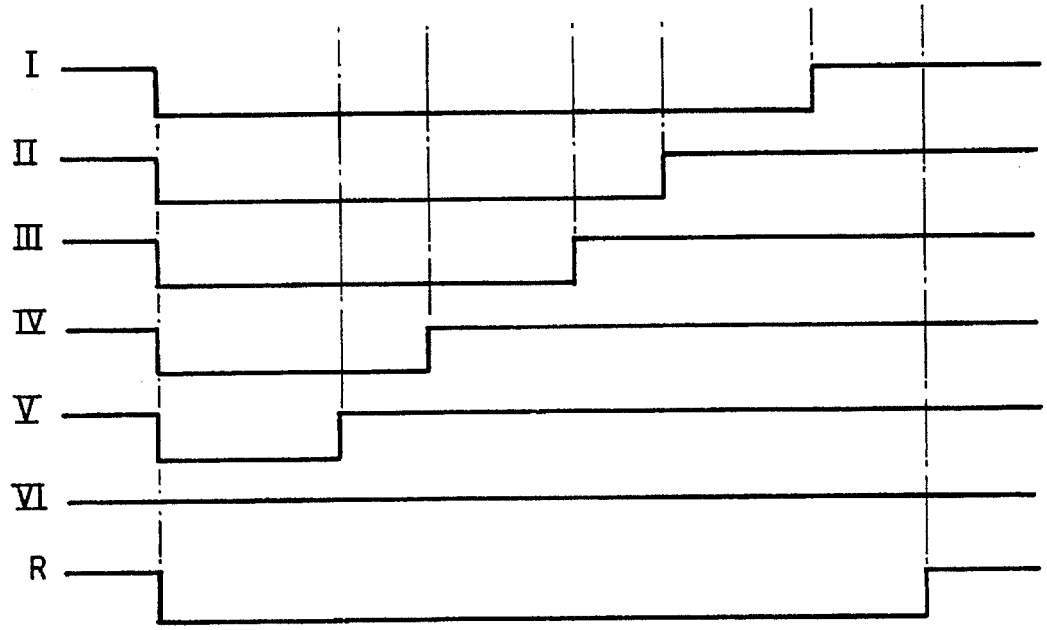
FIG. 3 shows a diagram of the power flow in the individual gears of the change-speed gearbox of FIG. 1.
Figure 2:
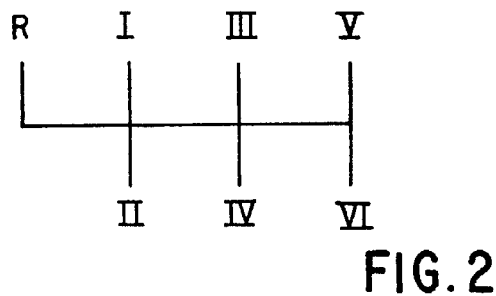
FIG. 2 shows a shift pattern for a manual-shift lever for shifting the change-speed gearbox of FIG. 1.

In the single-range gearbox 18 of FIG. 1, an output shaft 9 is arranged coaxially with an input shaft 8 and parallel to a layshaft 10.

The input shaft 8 is in continuous driving connection with the layshaft 10 by means of a constant mesh gear 11 in the form of a gear stage. The constant mesh gear 11 has a transmission ratio $i_{11}=53:24 =2.21$.

Gear stages 13 to 17 for the formation of gear ratios for five forward gears I to V are provided as respective drive connections between the layshaft 10 and the output shaft 9.

The freely revolving wheels of the gear stages 13 to 17 can be coupled to their shaft, in this case to the output shaft 9, in a known manner by means of change-speed selector clutches 21 to 23.

The gear stage 13 for the lowest forward gear I has a transmission ratio of 50:12, giving a gear ratio of 9.20 (FIG. 7, column 1, line 1L).

The gear stage 14 for the second gear has a transmission ratio of 45:19, giving a gear ratio of 5.23 (FIG. 7, column 1, line 2L) and a step change of 1.76 in relation to the first gear.

The gear stage 15 for the third gear has a transmission ratio of 47:33, giving a gear ratio of 3.15 (FIG. 7, column 1, line 3L) and a step change of 1.66 in relation to the second gear.

The gear stage 16 for the fourth gear has a transmission ratio of 35:38, giving a gear ratio of 2.03 (FIG. 7, column 1, line 4L) and a step change of 1.55 in relation to the third gear.

The gear stage 17 for the fifth gear has a transmission ratio of 28:45, giving a gear ratio of 1.37 and a step change of 1.48 in relation to the fourth gear.

The transmission ratio of the sixth gear is designed to be 1:1, this gear being selected by coupling the output shaft 9, via the change-speed selector clutch 23, to that gearwheel of the constant mesh gear 11 which is connected in torsionally rigid fashion to the input shaft 8. The step change from the sixth gear to the fifth gear is thus 1.37 (FIG. 7, column 1, lines 5S and 6L).

Figure 4:
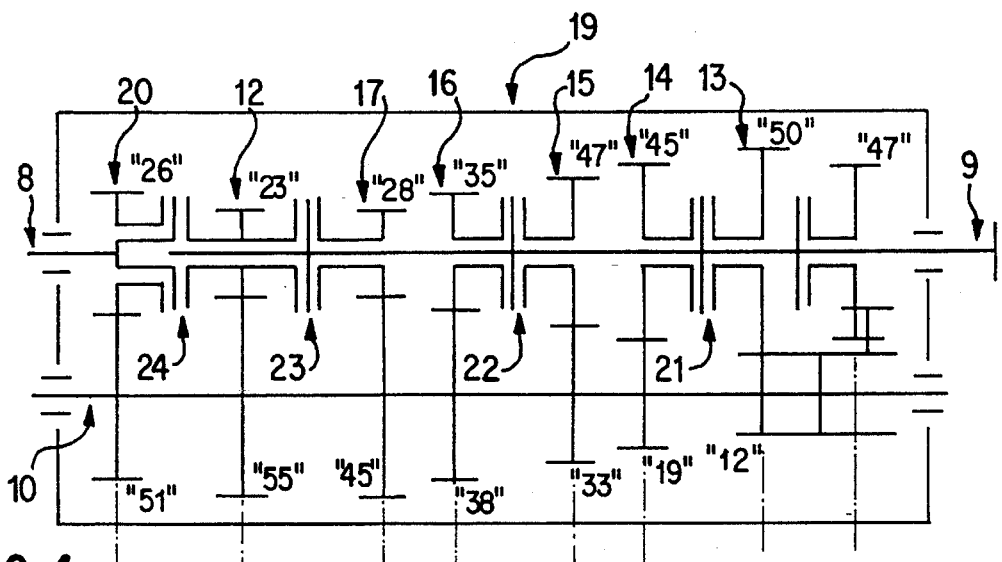
FIG. 4 shows the gearbox diagram of a change-speed gearbox which is a multi-speed gearbox according to another embodiment of the invention.

In the multi-speed transmission 19 of FIG. 4, an output shaft 9 is arranged coaxially with an input shaft 8 and parallel to a layshaft 10.

A constant mesh gear 12 in the form of a gear stage, and a splitter group 20, likewise in the form of a gear stage, can be selected alternatively as drive connections between the input shaft 8 and the layshaft 10 by means of a change-speed selector clutch 24. 10 The constant mesh gear 12 has a transmission ratio of 55:23 =2.39 (FIG. 7, column 2, line $i_{12}$), which is thus higher than the transmission ratio of 2.21 of the constant mesh gear 11 of the single-range gearbox 18 of FIG. 1.

The splitter group 20 has a transmission ratio of 51:26= 1.96 (FIG. 7, column 2, line $i_{20}$), which is thus lower (higher-speed) than the transmission ratio of 2.39 of the constant mesh gear 12 and stands in a particular relationship to the latter, as described below.

To form five basic ratios, from each of which two gear ratios are obtained using the constant mesh gear 12 and the splitter group 20, five gear stages 13 to 17 can be selected as a drive connection between the layshaft 10 and the output shaft 9 by means of three change-speed selector clutches 21 to 23.

Figure 6:
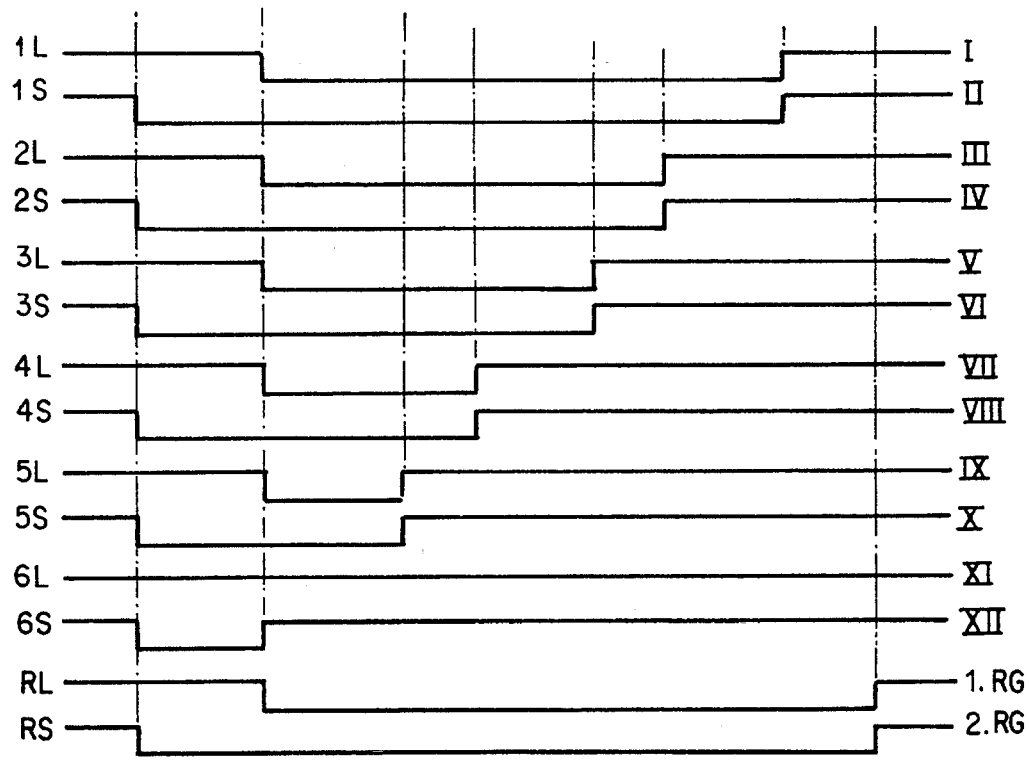
FIG. 6 shows a diagram showing the power flow in the individual gears of the change-speed gearbox of FIG. 4.
Figure 5:
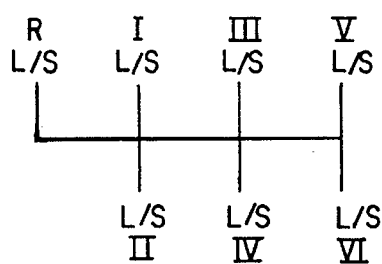
FIG. 5 shows a shift pattern for a manual-shift lever for shifting the change-speed gearbox of FIG. 4.

The gear stage 13 for gears I and II has a basic ratio of 50:12 and is therefore identical with gear stage 13 of the single-range gearbox 18 of FIG. 1. The first gear is, in a manner corresponding to that in the single range gearbox 18, formed by multiplicative combination of gear stage 13 with the constant mesh gear 12 (FIG. 6) and thus has a gear ratio of 9.96 (FIG. 7, column 2, line 1L). The second gear is formed by multiplicative combination of gear stage 13 with the splitter group 20 (FIG. 6) and thus has a gear ratio of 8.17, giving a step change in relation to the first gear of 1.22 (FIG. 7, column 2, line 1S).

The gear stage 14 for gears III and IV has a basic ratio of 45:19 and is therefore identical with gear stage 14 of the single-range gearbox 18 of FIG. 1. The third gear is formed, as in the case of the single-range gearbox 18 of FIG. 1, by multiplicative combination of gear stage 14 with the constant mesh gear 12 (FIG. 6) and thus has a gear ratio of 5.66, leading to a step change of 1.44 in relation to the second gear and to a theoretical step change of 1.76 in relation to the first gear, likewise formed using the constant mesh gear 12 (FIG. 7, column 2, line 2L). This theoretical step change of 1.76 is thus equal to the step change between gears I and II in the single-range gearbox 18 of FIG. 1. The fourth gear is formed by multiplicative combination of gear stage 14 with the splitter group 20 (FIG. 6) and therefore has a gear ratio of 4.65, leading to a step change of 1.22 in relation to the third gear (FIG. 7, column 2, line 2S).

The gear stage 15 for gears V and VI has a basic ratio of 47:33 and is therefore identical with gear stage 15 of the single-range gearbox 18 of FIG. 1. The fifth gear is formed, as in the case of the single-range gearbox 18 of FIG. 1, by multiplicative combination of gear stage 15 with the constant mesh gear 12 (FIG. 6) and thus has a gear ratio of 3.41, leading to a step change of 1.36 in relation to the fourth gear and to a theoretical step change of 1.66 in relation to the third gear, likewise formed using the constant mesh gear 12 (FIG. 7, column 2, line 3L). Consequently, the theoretical step change of 1.66 is equal to the step change in the single-range gearbox 18 of FIG. 1 between gears II and III. In the multi-speed gearbox 19 of FIG. 4, the fourth gear is formed by multiplicative combination of gear stage 15 with the splitter group 20 (FIG. 6) and thus has a gear ratio of 2.79, leading to a step change of 1.22 in relation to the fifth gear (FIG. 7, column 2, line 3S).

The gear stage 16 for gears VII and VIII has a basic ratio of 35:38 and is therefore identical with gear stage 16 of the single-range gearbox 18 of FIG. 1. In the multi-speed gearbox 19, the seventh gear is formed in a manner corresponding to that in the single-range gearbox 18 by multiplicative combination of gear stage 15 with a constant mesh gear 12 (FIG. 6) and thus has a gear ratio of 2.20, leading to a step change of 1.27 in relation to the sixth gear and to a theoretical step change of 1.55 in relation to the fifth gear, likewise formed using the constant mesh gear 12 (FIG. 7, column 2, line 4L). The theoretical step change of 1.55 is equal to the step change between gears III and IV in the single-range gearbox 18 of FIG. 1. In the multi-speed gearbox 19 of FIG. 4, the eighth gear is formed by multiplicative combination of gear stage 16 with the splitter group 20 (FIG. 6) and thus has a gear ratio of 1.81 (FIG. 7, column 2, line 4S), leading to a step change of 1.22 in relation to the seventh gear.

The gear stage 17 of the multi-speed gearbox 19 for gears IX and X has a basic ratio of 28:45 and is therefore identical with gear stage 17 of the single range gearbox 18 of FIG. 1. The ninth gear is formed, in a manner similar to that in the single-range gearbox 18, by multiplicative combination of gear stage 17 with the constant mesh gear 12 (FIG. 6) and thus has a gear ratio of 1.49 (FIG. 7, column 2, line 5L), leading to a step change of 1.21 in relation to the eighth gear and to a theoretical step change of 1.48 in relation to the seventh gear, likewise formed using the constant mesh gear 12. By its very nature, this theoretical step change of 1.48 is equal to the step change in the single-range gearbox 18 of FIG. 1 between gears IV and V. In the multi-speed gearbox 19, the tenth gear is formed by multiplicative combination of gear stage 17 with the splitter group 20 and thus has a gear ratio of 1.22, leading to a step change of 1.22 in relation to the ninth gear (FIG. 7, column 2, line 5S).

As already explained above, the eleventh gear in the multi-speed gearbox 19 of FIG. 4 has a ratio of 1.1 leading (FIG. 7, column 2, line 6L) to a step change of 1.22 in relation to the tenth gear and to a theoretical step change of 1.49 in relation to the ninth gear, likewise formed without the splitter group 20. In the multi-speed gearbox 19, the twelfth gear is, in accordance with FIG. 6, formed by multiplicative combination of the splitter group 20 driven by the input shaft 8 via the change-speed selector clutch 24 with the constant mesh gear 12 driving the output shaft 9 via the change-speed selector clutch 23, giving a gear ratio of 0.82 (FIG. 7, column 2, line 6S) which leads to a transmission jump of 1.22 in relation to the eleventh gear.

As can be seen from column 2 of FIG. 7, there is a narrow gradation in the multi-speed gearbox of FIG. 4 between the upper driving gears VII to XII, which are the most frequently used, the constant step change here of 1.22 being defined as the square root of the theoretical step change of 1.49 between the uppermost gears IX and XI, which are each formed without the splitter group 20.

What is claimed is:

1. A change-speed gearbox comprising:

an input shaft and an output shaft arranged coaxially;

a layshaft parallel to the input shaft and the output shaft;

a constant mesh gear formed by a gear stage and forming a drive connection between the input shaft and the layshaft; and a plurality of gear stages which form drive connections between the layshaft and the output shaft, the plurality of gear stages being optionally selectable and in conjunction with the constant mesh gear forming non-geometrically graduated gear ratios;

wherein the change-speed gearbox is configured as one of a single-range gearbox and a multi-speed gearbox, with identical gear stages being used as drive connections between the layshaft and the output shaft for both the single-range gearbox configuration and the multi-speed gearbox configurations;

wherein a constant mesh gear of the single-range gearbox configuration has a smaller ratio than a constant mesh gear of the multi-speed gearbox configuration, the multi-speed gearbox configuration including a splitter group formed by a gear stage which can be selected alternatively with the constant mesh gear of the multi-speed gearbox to serve as the drive connection between the input shaft and the layshaft; and wherein in the multi-speed gearbox configuration, the quotient of the transmission ratio of the constant mesh gear and the transmission ratio of the splitter group is at least approximately equal to the square root of a ratio jump between a highest gear formed without the splitter group and a next highest gear formed without the splitter group.

* * * * *